Jan. 12, 1937. C. N. FLAGG 2,067,629
AUTOMATIC VALVE FOR HEATING SYSTEMS
Filed July 28, 1932 2 Sheets-Sheet 1
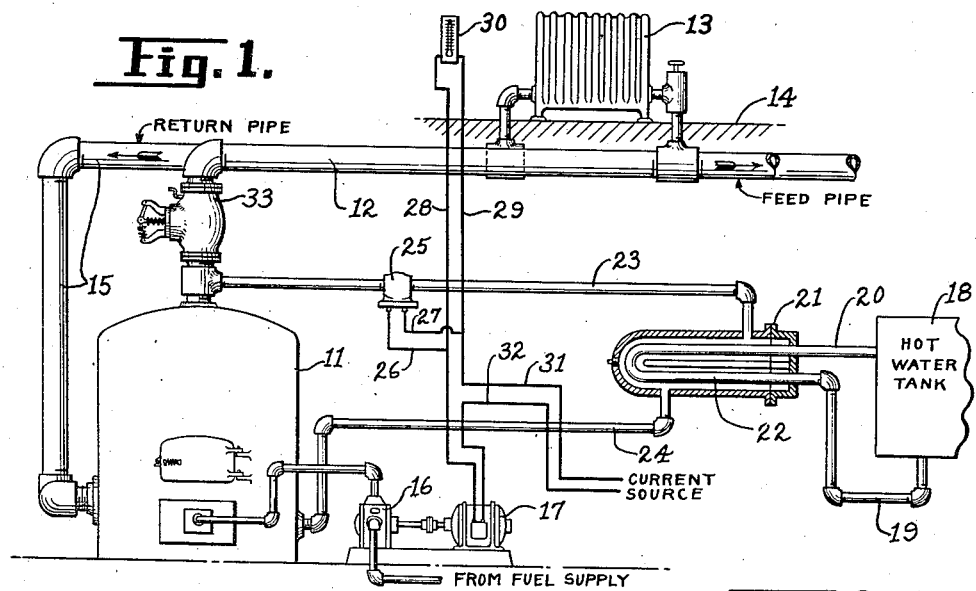
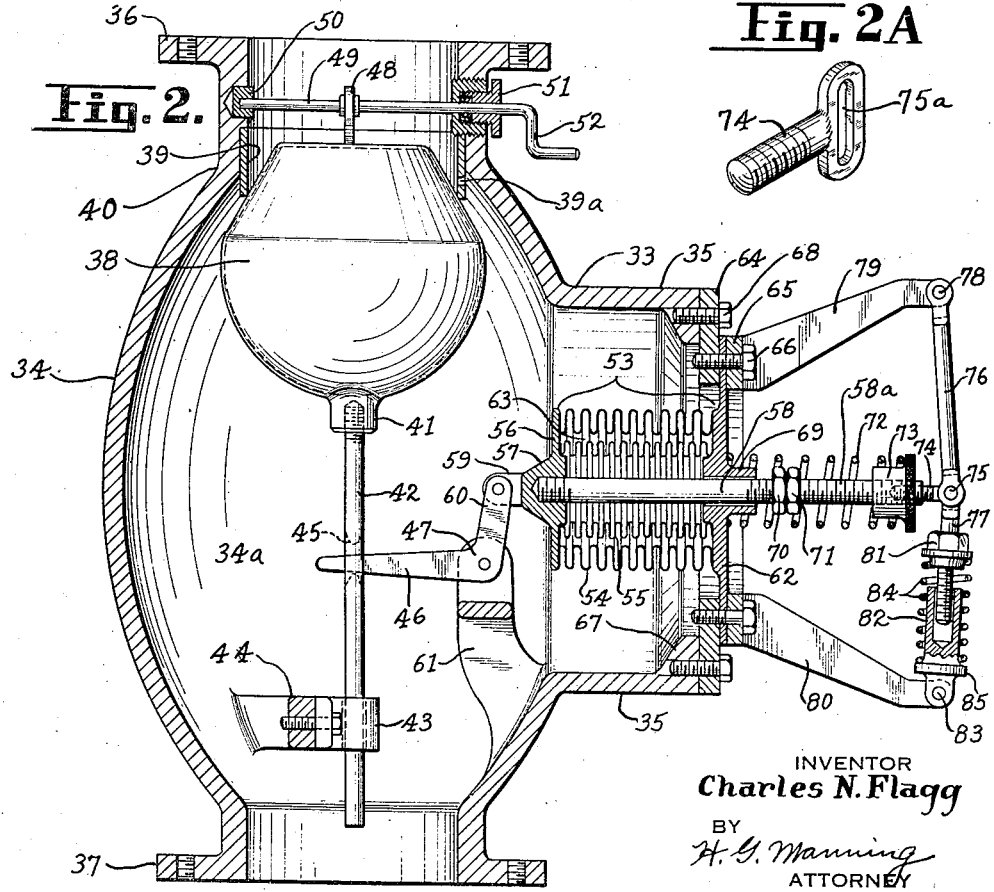
INVENTOR
Charles N. Flagg
BY
H. G. Manning
ATTORNEY Jan. 12, 1937.  C. N. FLAGG  2,067,629
AUTOMATIC VALVE FOR HEATING SYSTEMS
Filed July 28, 1932  2 Sheets-Sheet 2

INVENTOR
Charles N. Flagg.
BY
H. G. Manning
ATTORNEY

Patented Jan. 12, 1937

2,067,629

UNITED STATES PATENT OFFICE 2,067,629

AUTOMATIC VALVE FOR HEATING SYSTEMS

Charles N. Flagg, Meriden, Conn.

Application July 28, 1932, Serial No. 625,348

7 Claims. (Cl. 236—93)

This invention relates to hot water heating systems, and more particularly to an automatically controlled indirect domestic hot water supply and house heating system.

One object of this invention is to provide a system of the above nature having means for preventing the circulation of water in the house heating system until the temperature of the water in the boiler has risen above the point required to heat water for domestic purposes.

A further object is to provide a system of the above nature having a thermostatically controlled valve adapted to open for permitting the circulation of water in the house heating system, said valve being adapted to operate between two adjustable predetermined temperatures.

A further object is to provide a system of the above nature in which the operation of the thermostatically controlled valve is effected by a bellows member containing a volatile fluid and wholly enclosed within the casing of the valve, together with adjusting means extending exteriorly of said casing for regulating the action of the bellows member.

A further object is to provide a thermostatically controlled valve of the above nature in which the bellows member may be associated with a toggle mechanism to delay the movement of said bellows member and impart a snap action to the valve.

A further object is to provide a device of the above nature which will be simple in construction, inexpensive to manufacture, easy to install and manipulate, compact, ornamental in appearance and very efficient and durable in use.

With these and other objects in view there have been illustrated on the accompanying drawings two forms in which the invention may be conveniently embodied in practice.

In the drawings:

Fig. 1 represents a diagrammatic view of a hot water heating system and a cooperatively related domestic hot water supply system.

Fig. 2 is a longitudinal sectional view through one form of the thermostatically controlled valve unit.

Fig. 2A is a detail perspective view showing the connection between the pressure adjusting shaft and the toggle mechanism.

Figure 3:
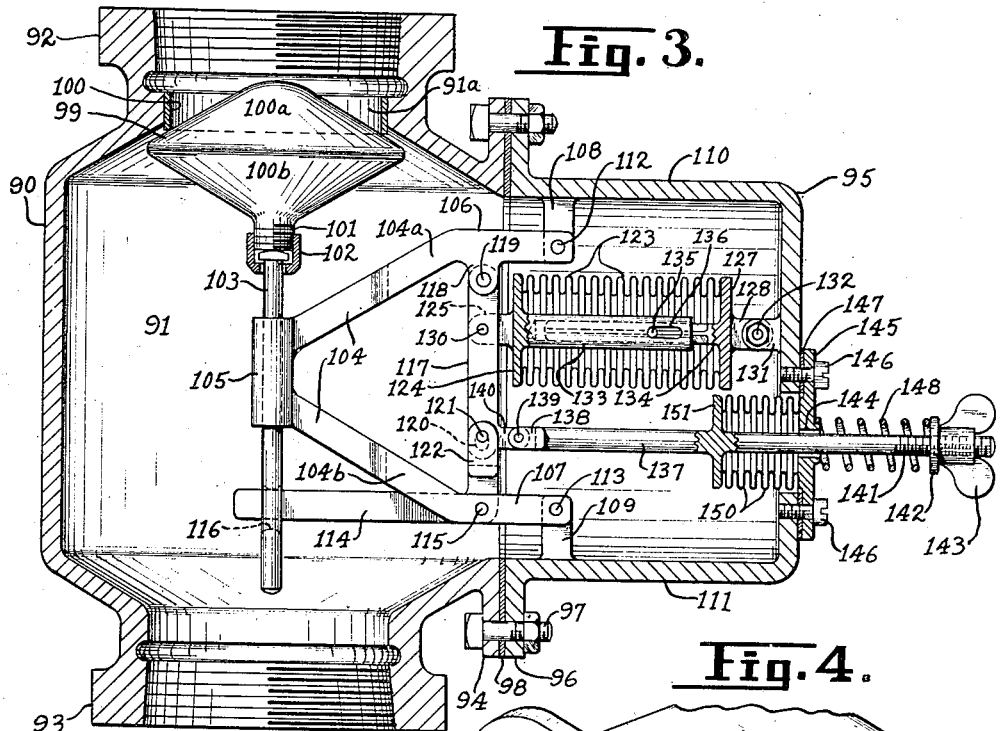
Fig. 3 is a longitudinal sectional view similar to Fig. 2 of a modified form of thermostatically controlled valve unit.

In a hot water house heating system wherein are combined the functions of general space heating and the heating of a domestic water supply through the medium of a heat exchanger, it is desirable that both the fire or other primary source of heat and the circulation of water in the house heating system be subject to control. The intensity of the fire can be regulated automatically in any one of a number of ways well known to those versed in the art, the general method being to place the fuel under the control of a thermostatic device responsive either to the temperature of the air in the room to be heated or of the water in the heating system. Under this method of control it is found that the water in the circulating system, except perhaps in times of extremely cold weather, is maintained at a temperature too low to heat water for domestic use, thus making it impracticable to employ the system of indirect heating for supplying hot water for domestic uses.

In the present invention the above and other disadvantages have been avoided by providing an automatic valve adapted to be placed in the feed pipe of the house heating system, said valve being actuated by a thermostatic member also located in said feed pipe and responsive to the temperature of the water in said system.

Referring now to the drawings in which like reference numerals denote corresponding parts throughout the several views, the numeral 11 indicates a hot water boiler having a feed pipe 12 leading from the top thereof and adapted to be connected to a plurality of radiators 13 arranged throughout the house or other building 14. The radiators 13 are connected to a return pipe 15 leading back to the boiler 11 and entering the lower portion thereof. The boiler may be heated by means of an oil burner 16 operated by a motor 17.

The domestic hot water supply apparatus comprises a hot water tank 18, inlet and outlet pipes 19 and 20 respectively, and a heat exchanger 21. The water in the tank 18 is circulated through a heating coil 22 located within the exchanger 21, and receives heat from the higher temperature water circulating in the body of said exchanger. The hot water passing through the body of the said exchanger is drawn from the main feed pipe 12 through a smaller feed pipe 23, and is returned to the boiler 11 through a return pipe 24.

The basic regulation of the water temperature in the boiler 11 is obtained by a thermostatic controller 25 (not shown in detail, and sometimes inaccurately referred to as a "hydrostat"), having its temperature-sensitive element exposed to the water in the feed pipe 23 leading to the heat exchanger. This controller may be any one of the large variety of such devices known to those versed in the art, its general action being to bridge, or to decrease the resistance between the two conductors 26 and 27, upon a lowering of the actuating temperature, thus reacting upon the motor 17 in such a manner as to cause a greater volume of fuel to be supplied to the burner, and to perform in a reverse sense upon an increase of the temperature of the water in the pipe 23. Under ordinary conditions, the setting of the controller 25 would be such as to maintain the water in the feed pipe 23 at a temperature approximating 180 degrees, Fahr.

A second thermostat 30 is located in the air of the room to be heated, and is adjusted to close its electrical contacts at a temperature of about 70 degrees, Fahr. Since, as will be seen from the diagram (Fig. 1) the terminals of the thermostat 30 are in parallel with those of the controller 25, it is evident that upon a fall of room temperature below 70 degrees, the thermostat 30 will take predominance over the controller 25, increasing the fuel supply, and tending to raise the temperature of the water in the circulating system to a value higher than that demanded by the heat exchanger for the domestic supply.

Due to the fact that the water temperature for heating the building 14 and for keeping the domestic hot water tank 18 at its normal temperature will be subject to considerable variation at different seasons of the year, the present invention contemplates the use in the feed pipe line 12 leading from the boiler 11 to the radiators 13 of a thermostatically controlled valve, generally indicated by the numeral 33, which is adapted to remain closed until the temperature in the boiler rises above that required for heating the domestic water supply. As shown in Fig. 1, the valve 33 is located in the feed pipe 12 above the point at which the heat exchanger feed pipe 23 is attached thereto.

*Automatic valve unit*

The automatic valve unit 33, as best shown in Fig. 2, consists of an oval shaped hollow body 34 having an internal chamber 34a, a laterally projecting thermostat housing 35, and upper and lower flanges 36 and 37 for connecting said valve unit with the feed pipe 12. A hollow float member 38 adapted to be partially or wholly supported by the buoyancy of the water, which under operating conditions fills the valve body 34, is located in the upper section of the chamber 34a. The lower part of said float member is preferably made hemispherical in form, and the upper part is made conical so that it will seat tightly against the sharp lower edge of an annular valve seat 39 for forming a tight seal between the float chamber 34a and the upper neck 40 of the said valve body 34. If desired, a small hole 39a may be drilled through the seat ring 39, bypassing the valve and preventing the accumulation of entrapped air.

The lower part of the float member 38 is provided with a tapped boss 41 for receiving the threaded end of a guide rod or valve stem 42 slidably fitted into a guide block 43 which is secured to a bracket 44 formed integrally with the interior wall of the valve body 34. An elongated slot 45 is provided at an intermediate position in the guide rod 42, for receiving the end of a horizontal arm 46 forming a part of a bell-crank lever 47.

For the purpose of limiting the upward travel of the float member 38, and if desired, preventing it from seating upon the ring 39, there is provided a cam or stop member 48 supported at an intermediate position upon a horizontal shaft 49. The inner end of the shaft 49 is journaled in a bearing bushing 50 secured to the interior wall of the neck 40. The outer end of the shaft 49 is journaled in a stuffing box 51 and is provided with a crank handle 52 for manual adjustment. The slot 45 in the guide rod 42, being longer than the width of the arm 46, sufficient lost motion is provided to enable the seating member 38 to be unseated by rotation of the cam 48 without interfering with the normal action of the bell-crank lever.

In order to automatically operate the float valve mechanism and control the amount of water flowing past the seating member 38, provision is made of a thermostatic unit 53 located within the chamber 35. The thermostatic unit 53 consists of a pair of metal bellows tubes 54 and 55, the former being concentric about the latter, thus providing an annular space therebetween, and as clearly shown in Fig. 2, the inner end of the bellows tubes 54 and 55 may be secured to a movable end cap 56, as by soldering. The cap 56 is provided with a central tapped boss 57 to which is secured one end of a horizontal shaft 58 located within the bellows unit and extending outside the chamber 35.

The inner extremity of the boss 57 has an integral bifurcated lug 59, to which is pivotally attached the upper end of the vertical arm 60 of the bell-crank 47. The bell-crank lever 47 may be pivotally supported upon the upper end of a support bracket 61 formed integral with the interior wall of the oval chamber 34a.

The outer ends of the bellows tubes 54 and 55 are suitably sealed to the inner wall of the cover plate 62, thus forming a non-leaking annular chamber 63, within which may be contained a volatile fluid, such as a mixture of water, alcohol and ether. The cover plate 62 is tightly clamped between two annular rings 64 and 65 by means of the cap screws 66. The inner ring 64, which is larger in diameter than the outer ring 65, is secured to an inwardly extending flange 67 of the housing 35 by means of screws 68. The cover plate 62 is provided with a central hollow boss 69, through which is loosely and slidably fitted the shaft 58. It is to be noted that by the use of a double bellows construction the shaft 58 may extend out beyond the thermostatic unit 53 without the necessity of employing a stuffing box, which would have an undesirable retarding effect upon the movements of said shaft 58.

In order to limit the expansion of the thermostatic unit 53, the outer threaded section 58a of the shaft 58 is provided with an adjustable stop nut 70 adapted to abut against the outer end of the hollow boss 69. The stop nut may be locked at any adjusted position upon the shaft 58 by means of the lock nut 71.

The expansive power of the thermostat may be controlled by means of a compression spring 72 surrounding the outer end of the shaft 58 and adapted to be compressed between the cover plate 62 and a flanged bushing 73 adjustably screwed to the threaded end of said shaft 58. As shown in Fig. 2 the flanged bushing 73 may be knurled for convenience of manipulation.

In order to delay the movement of the thermostatic unit 53 for the purpose of varying the temperature limits between which the valve opens and closes, an eye-screw 74 having an elongated vertical slot 75a is screwed into the tapped extremity of the shaft 58 and surrounds a pin 75. A pair of toggle shafts 76 and 77 are suitably journaled to the pivot pin 75. The upper end of the toggle shaft 76 is connected directly to another pivot pin 78, transversely secured to the outer end of one of a pair of inclined arms 79 and 80 secured to the outer clamping ring 65. The toggle shaft 77 has its lower free end threaded and provided with a flanged nut 81 adjustably secured thereon. As shown in Fig. 2, the threaded end of the shaft is slidably fitted within a sleeve member 82, the outer end of which is journaled to a transverse pivot pin 83 located at the outer end of the lower inclined arm 80. The toggle shaft 77 is adapted to slide freely within the sleeve 82, against the influence of a compression spring 84 encompassing the said sleeve 82, and located between the flanged nut 81 and a flange 85 formed integral to the lower end of the sleeve 82. The resistance of the toggle action of the shafts 76 and 77 may be controlled by adjusting the position of the flanged nut 81 on the threaded section of the shaft 77.

It is obvious from this construction that when the volatile fluid within the thermostatic bellows unit 53 is being heated by the influence of the hot water within the chamber 34a, the complete expansion of said unit 53 will be retarded or delayed until the center pivot pin 75 is brought into a dead center with the two outer pivot pins 78 and 83, after which the expansive power of the spring 84 will cause a snap action to occur immediately unseating the float valve to its fullest extent. Under a cooling influence, the action of the thermostatic element 53 and associated parts will be the reverse of that just described, causing the float member 38 to seat quickly against the ring 39, or to strike against the cam member 48 as the case may be.

*Operation*

In the operation of the indirect heating system as shown in the diagrammatic view of Fig. 1, the thermostatic controller 25 which is employed to keep the water in the tank 18 at the correct temperature for domestic purposes will first be set to hold the water in the boiler 11 within a temperature range between 160 and 180 degrees Fahr. The thermostatically controlled float valve 33 will then be set to open only at temperatures above 180 degrees, and thus to remain closed until the thermostat 30 in the living quarters of the building 14 calls for more heat, under which condition the thermostat 30, as explained above, takes predominance over the controller 25, increasing the fuel supply until the water temperature is raised by the necessary amount.

When the temperature in the boiler 11 rises above 180 degrees, or to that point at which the thermostatic valve 33 is set to operate, the expansion of the thermostatic bellows unit 53 will overcome the action of the toggle, causing the bell-crank lever 47 to suddenly depress the float member 38 of the valve through the agency of the stem or guide rod 42, which action permits circulation of hot water upwardly through the feed pipe 12 to the radiators 13.

Conversely, as the temperature in the living quarters rises and reaches the point at which the room thermostat 30 opens its contacts, the motor 17 will revert to normal control, subject only to the thermostatic controller 25, causing the temperature of the water in the boiler to fall below 180 degrees, which lowering of temperature will in turn cause the seating member 38 to rise and close the valve.

During relatively cold weather the float valve member 38 may be partly depressed or opened by the proper manual adjustment of the cam 48. The purpose of this is to avoid too great fluctuations of the temperature of the water in the heating system during the winter months. At the close of the heating season the cam 48 may be manually released, so that the float member 38, under the influence of the thermostatic bellows unit 53, will completely seal the valve 33 and thus prevent heating of the building without interfering with the use of the boiler 11 for the purpose of heating water in the tank for domestic purposes.

*Alternative form of valve*

In the modified form of automatic valve unit shown in Figs. 3 and 4, provision is made of a substantially cylindrical hollow valve body 90 having an interior chamber 91, said chamber having upper and lower tapped bosses 92 and 93 adapted for connection into the pipe line 12, and a side flange 94 adapted to be connected to a housing 95, which contains a part of and supports the whole of a thermostatic mechanism to be later described. The housing 95 has a flange 96 and is held upon the valve body 90 by bolts 97, a leak-proof gasket 98 being located therebetween.

Figure 4:
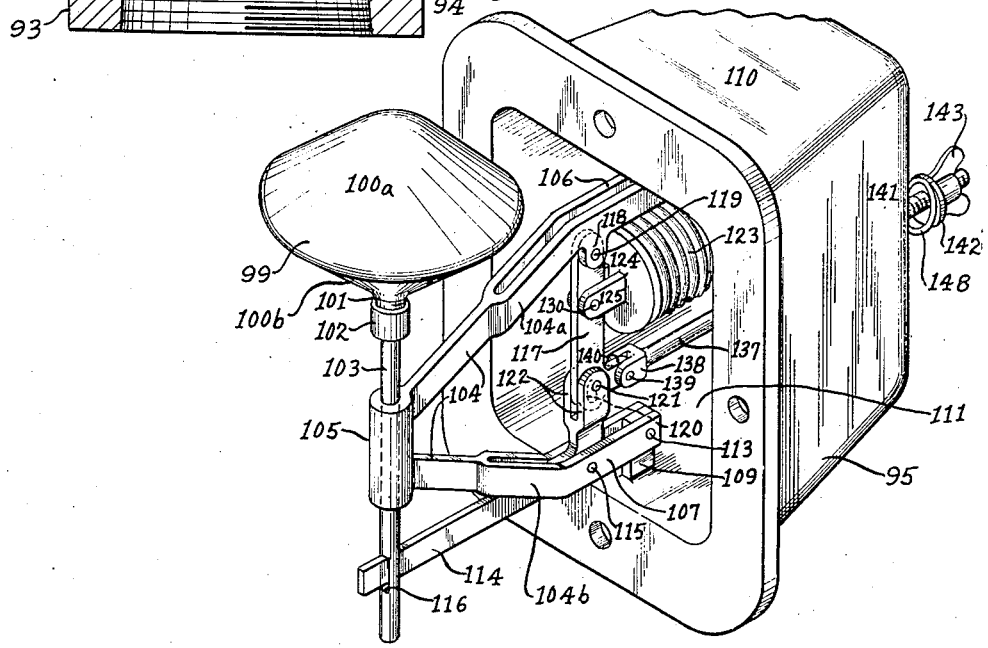
Fig. 4 is a perspective view of said modified form of valve unit, showing a portion of the supporting housing and interior mechanism.

The valve proper consists of a float member 99 adapted to seat upon a ring 100, firmly held within the upper portion of the valve body 90, as clearly shown in Fig. 3, thus sealing the main chamber 91 off from the outlet port 91a. The float member 99 is preferably made in the form of a pair of conical surfaces 100a and 100b having their bases in contact, the upper conical surface 100a being adapted to engage the ring 100, and the lower surface 100b carrying a threaded boss 101 adapted to be threadedly engaged by a cup-shaped retaining nut 102 which serves to hold said boss 101 in intimate contact with the headed end of a depending guide rod or valve stem 103. The float member 99 may be made hollow, or otherwise lightened in such a manner that when disposed in a vertical position, the buoyant effect of water contained in the valve body 90 will tend to oppose the weight of the said float member 99 and attached parts, and hold it in a condition of neutral equilibrium.

The guide rod or stem 103 is maintained in proper alinement with the valve body for guiding the float member 99 into seating position, by means of a guide bracket 104, carrying a vertical sleeve 105, in which said stem 103 is free to slide. The bracket 104 comprises a pair of diverging bifurcated arms 104a and 104b terminating in horizontal upper and lower extensions 106 and 107 adapted to be secured respectively to a pair of vertical lugs 108 and 109 formed integral with the upper and lower walls 110 and 111 of the housing 95, as by pins 112 and 113.

For the purpose of actuating the float member 99 through the agency of the valve stem 103, there is provided a bell-crank lever 114, pivotally supported within the lower bifurcated arms 104b of the bracket 104 by means of the pin 115. The horizontal arm of the lever 114 passes through a slot 116 in the lower portion of the valve stem 103, thus providing operative engagement between said horizontal arm and the float member 99. The slot 116 is preferably made longer than the width of the coacting portion of the bell-crank lever 114, thus providing a certain amount of lost motion.

A vertically disposed lever 117 is pivotally attached to a pair of opposed dependent lugs 118 on the guide bracket arms 104a by a pin 119. The lever 117 has a slotted opening 120 in its lower end for slidably receiving a pin 121 carried by a pair of upturned arms 122 of said bell-crank lever 114.

A thermostatic mechanism extends from an intermediate point on the vertical lever 117 to a fixed point on the rear wall of the housing 95. This mechanism includes a metal bellows 123 which is closed at its forward end by a plate 124 having a pair of forwardly projecting lugs 125, and is closed at its rear end by a plate 127 having a pair of rearwardly projecting lugs 128.

The lugs 125 embrace and are pivotally attached to the lever 117 by a pin 130. The rear lugs 128 are similarly affixed to a lug 131 forming an integral part of the rear wall of the housing 95 by means of a bolt 132. For the purpose of guiding and preventing unnatural distortion of the bellows structure, provision is made within the bellows 123 of a backwardly extending tubular member 133 forming an integral part of the front plate 124 arranged in telescopic relation to a forwardly extending rod 134, said member 134 being adapted to slide within the tubular member 133, and forming an integral part of the rear plate 127.

In order to provide clearance and prevent possible clogging due to entrapped particles of foreign matter, as well as obviating any "piston" action of the rod 134 within the tubular member 133, said telescoping members 133 and 134 are preferably made of different cross-sections. For instance, the interior of the member 133 may be made cylindrical, while the cross-section of the member 134 may be in the form of a square, whereby line contacts will be provided assuring satisfactory guiding action without any obstruction to free sliding motion.

For the purpose of limiting the longitudinal travel of the bellows 123 there is provided a pin 135 passing through the member 134 and slidably positioned in opposed slots 136 formed in the sides of the tubular member 133. The bellows structure 123 which has just been described is filled with a suitable expansible or volatile fluid, so that it will have a tendency to expand longitudinally.

In order to control the action of the expansible bellows from the exterior of the housing, provision is made of a horizontal rod 137 having a bifurcated lug 138 at its forward end pivotally attached by a pin 139 to a rearwardly extending lug 140 on the lever 117. The rod 137 has a threaded outer portion 141 extending out of the housing and carrying a washer 142 and a thumb nut 143. The rod 137 passes freely through an opening 144 in a removable cover plate 145 which is attached to the rear wall of the housing 95 by screws 146, the joint being made tight by the gasket 147. A compression spring 148 located between a washer 142 and the plate 145 exerts force on the upstanding end of the bell-crank lever 114 and the depending end of the vertical lever 117, tending to oppose the expansive action of the bellows 123. It will be readily seen that by adjusting the position of the thumb nut 143 on the threaded portion 141 of the rod 137, the force of the spring 148 may be varied through a wide range.

For the purpose of making a tight and relatively frictionless joint between the cover plate 145 and the horizontal rod 137, there is provided a small bellows member 150 soldered at one end to said cover plate and at its other end to a flange 151 which forms an integral part of the rod 137, thus constituting a fluid-tight joint of what is known as the "packless" type.

While the valve for controlling the communication between the boiler and the radiators is herein shown as a vertically rising float valve, it will be understood that it is within the spirit and scope of the invention to employ other types of valves for accomplishing this purpose, such as a horizontally operating valve controlled entirely by the thermostat mechanism, etc.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a heating apparatus, a boiler, means to heat said boiler, a room heating system in circuit with said boiler, a valve in said circuit, a casing therefor, said valve being held up against its seat by the buoyancy of the water in said casing, a bell-crank lever connected to said valve, and a sealed thermostatic bellows connected to said lever and responsive to the temperature of the water in said casing for lowering said valve from its seat to permit water to circulate in said room heating system.

2. In a heating apparatus, a boiler, means for heating said boiler, a room heating circuit including said boiler, a hollow float valve in said circuit, a casing therefor having a valve seat, the buoyancy of the water in said casing normally maintaining said valve upwardly upon its seat, thermostatic means located in said casing for lowering said valve from its seat, and means extending outside said casing for controlling said thermostatic means.

3. In a heating apparatus, a boiler, means for heating said boiler, a room heating circuit including said boiler, a hollow float valve in said circuit, a casing therefor having a valve seat, the buoyancy of the water in said casing normally maintaining said valve upwardly upon its seat, a hollow annular bellows thermostat located in said casing for lowering said valve from its seat, and means extending outside said casing for controlling said thermostatic means.

4. In a thermostatically controlled valve, a hollow casing having inlet and outlet ports, a hollow valve member normally held against said outlet port by the buoyancy of the liquid in said casing, a guiding rod depending from said valve member, a guide bracket for said rod, a bell-crank lever pivotally supported in said chamber, one arm of said lever being connected to said guide rod, and thermostatic valve controlling means located in said casing and having pivotal connection to the other arm of said bell-crank lever for lowering said valve from its seat when the temperature in said casing rises above a certain point.

5. In a thermostatically controlled valve, a hollow casing having inlet and outlet ports, a hollow valve member normally held against said outlet port by the buoyancy of the liquid in said casing, a guiding rod depending from said valve member, a guide bracket for said rod, a bell-crank lever pivotally supported in said chamber, one arm of said lever being connected to said guide rod, and an adjustable thermostatic valve controlling means located in said casing and having pivotal connection to the other arm of said bell-crank lever for lowering said valve from its seat when the temperature in said casing rises above a certain point.

6. In a thermostatically operated liquid control valve, a hollow liquid-containing casing having inlet and outlet ports, a valve in said casing having a weight less than the weight of the liquid displaced thereby, the buoyancy of the liquid in said casing normally holding said valve against said outlet port, and thermostatic means in said casing for lowering said valve from its seat whenever the temperature of the liquid in said casing exceeds a predetermined point.

7. In a liquid control valve, a hollow casing having a lower inlet port and an upper outlet port, a movable valve member in said casing, means to normally hold said valve member against said outlet port, a rod depending from said valve member and flexibly connected thereto, means on said casing for loosely embracing said rod for guiding it, and thermostatic means in said casing for lowering said valve member from said outlet port whenever the temperature of the liquid in said casing exceeds a predetermined point.

CHARLES N. FLAGG.